Aug. 18, 1931.  R. B. TAYLOR  1,819,575
DEVICE FOR RECOVERING PINEAPPLE FROM WASTE SHELLS
Filed Oct. 26, 1927
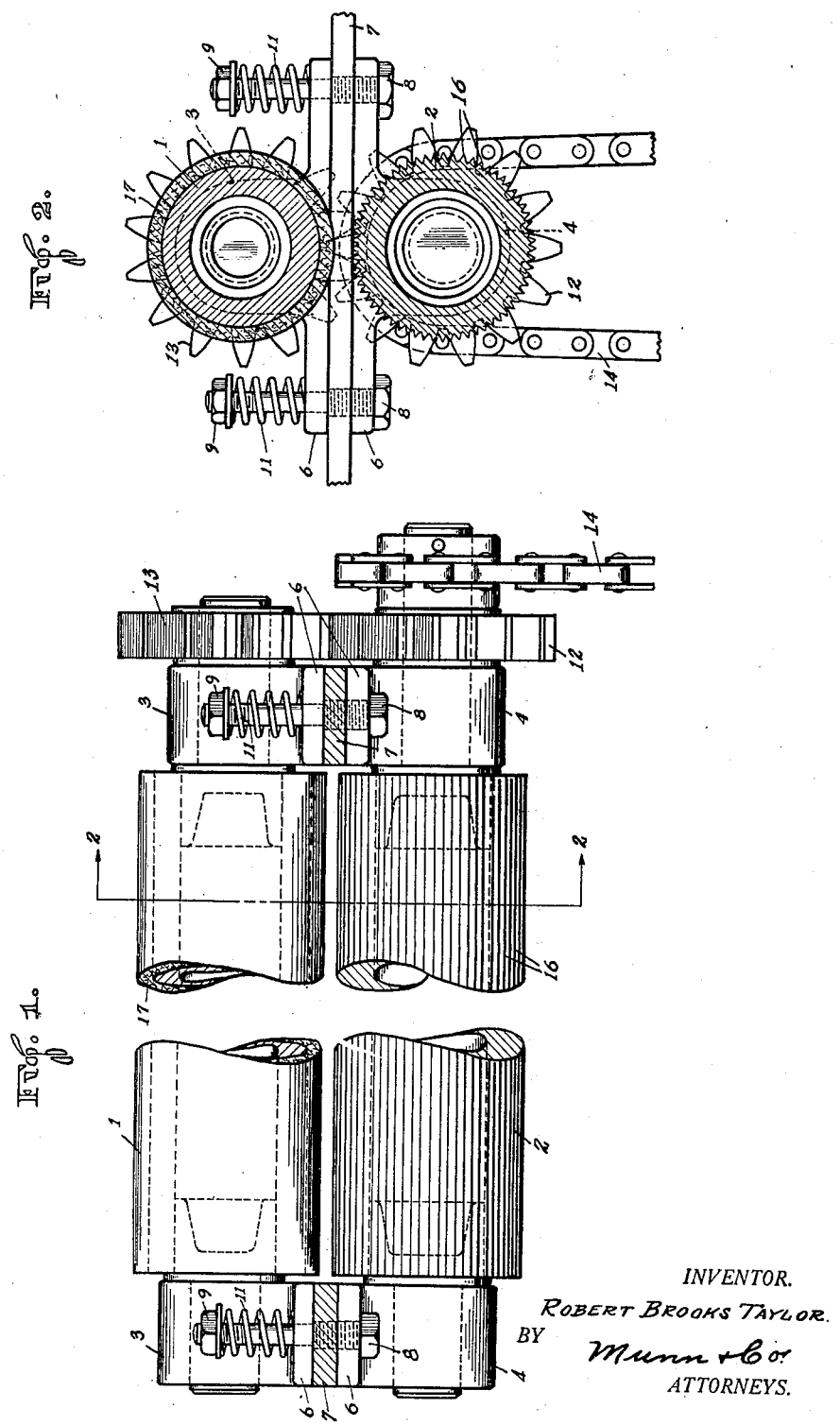
INVENTOR.
ROBERT BROOKS TAYLOR.
BY Munn +Co
ATTORNEYS.

Patented Aug. 18, 1931

1,819,575

UNITED STATES PATENT OFFICE

ROBERT B. TAYLOR, OF KAPAA, TERRITORY OF HAWAII, ASSIGNOR TO HAWAIIAN CANNERIES, LTD., OF KAPAA, HAWAII, A CORPORATION OF HAWAII

DEVICE FOR RECOVERING PINEAPPLE FROM WASTE SHELLS

Application filed October 26, 1927. Serial No. 228,952.

The present invention relates to improvements in the method of and means for removing from pineapple shells that have previously gone through a sheller the remaining pineapple flesh or juice that adheres to the shell. Devices that have been used before for this purpose are made in such a manner as to also remove the eyes and other pieces of shell, so that the resulting product is not salable. In a machine constructed in accordance with my invention a large percentage of the remaining pineapple is removed and a relatively clean and marketable product is obtained.

My machine used for this purpose is very simple in construction, and the principle of my process is to squeeze the pineapple shell between two rollers, one of which is formed with a gripping surface for grippingly engaging the rough or outer side of the pineapple, while the other roller is made smooth for squeezing the flesh and juice of the pineapple away from the shell.

Further objects and advantages of my invention will appear as the specification proceeds.

The preferred form of my invention is illustrated in the accompanying drawings, in which Figure 1 shows a side view of my invention; and Figure 2, a vertical section taken along line 2—2 of Figure 1.

While I have shown only the preferred form of the invention, it should be understood that various changes or modifications may be made within the scope of the claims hereto attached without departing from the spirit of the invention.

In its preferred form my device comprises two rollers 1 and 2 rotatably mounted in co-acting relation in upper bearings 3 and lower bearings 4, respectively, which latter bearings are flanged as shown at 6 and fastened to opposite faces of a supporting plate 7 by means of bolts 8 extending through corresponding flanges and the supporting plate, and held in place by means of nuts 9 and springs 11 interposed between the nuts and one of the flanges, so that the upper bearings are adapted to yield and to allow the upper roller to rise, or the two rollers to separate under the influence of a shell of abnormal thickness.

The two rollers 1 and 2 are disposed in very close proximity so as to exercise pressure on a shell squeezed therebetween. The two rollers are interconnected by means of two gear wheels 12 and 13 and rotary motion is imparted to one of the rollers by means of a sprocket chain 14.

One of the rollers is made smooth in its surface, while the other roller is formed with a gripping surface, gripping action being produced in any suitable manner as by a plurality of parallel grooves 16 extending over the surface in axial direction. The smooth roller is preferably rubber-coated as shown at 17.

The manner of using my device will be readily understood from the foregoing description. A piece of shell is fed into the space between the rollers and is gripped by the lower roller which engages with the outer or rough surface of the pineapple, while the upper roller rides over the inner face of the shell and co-operates with the lower roller in squeezing any pineapple flash or juice adhering to the inner face therefrom.

The percentage of pineapple thus saved is very considerable and at times reaches a percentage of the fresh fruit even greater than that recovered by the original device.

I claim:

1. The method of recovering pineapple from shells containing the same, which consists in gripping the shell and subjecting the inner face thereof to rolling action relative to the shell.

2. The method of recovering pineapple from shells containing the same which consists in advancing the shell while subjecting the inner face thereof to rolling action.

3. The method of recovering pineapple from shells containing the same which consists in simultaneously subjecting the outer face of the shell to gripping action and the inner face to rolling action.

4. The method of recovering pineapple from shells containing the same which consists in advancing the shell while subjecting the outer face to gripping action and the inner face to rolling action.

ROBERT B. TAYLOR.